United States Patent Office 3,316,116
Patented Apr. 25, 1967

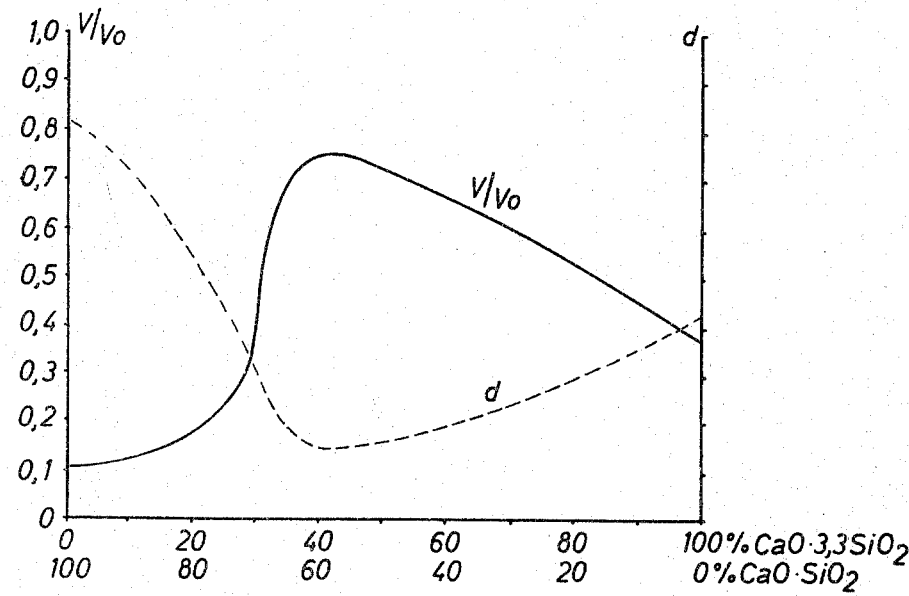

3,316,116
PROCESS FOR THE PRODUCTION OF FINELY DISPERSED CALCIUM SILICATE FILLERS
Ernst Podschus, Leverkusen, Germany, assignor to Farbenfabriken Bayer Aktiengesellschaft, Leverkusen, Germany, a German corporation
Filed Apr. 14, 1964, Ser. No. 359,780
Claims priority, application Germany, Oct. 15, 1960, F 32,353; Dec. 18, 1961, F 35,583; June 6, 1962, F 37,002
15 Claims. (Cl. 106—306)

This is a continuation-in-part of copending applications Ser. No. 144,291, filed Oct. 11, 1961, now abandoned, Ser. No. 194,146, filed May 11, 1962, now abandoned, and Ser. No. 285,381, filed June 4, 1963, now abandoned.

This invention relates to a process for producing a finely dispersed calcium silicate filler. It is an object of the present invention to provide a new finely dispersed calcium silicate filler with a $CaO:SiO_2$ ratio of between 1:1.2 and 1:3 with a disturbed tobermorite-like structure indicated by the 4 to 7 strongest X-ray diffraction lines of poorly crystallized tobermorite and a specific surface area of 300 to 400 sq. m./g. according to BET.

It is another object of the present invention to provide a new process of producing this new finely dispersed calcium silicate filler. It is still another object of the present invention to provide a new and improved process for the production of finely dispersed calcium silicate fillers which are excellently suited as reinforcing fillers for elastomers, as anticaking agents or grinding assistants, as carrier materials for active substances and for the thickening of liquids.

Still further objects of the present invention will become apparent as the following description proceeds.

The calcium silicate fillers found in commerce are largely obtained by precipitation from calcium chloride and sodium silicate ($Na_2O \cdot 3.3SiO_2$) solutions. They are amorphous to X-rays, and contain water linked in the form of silanol groups as well as free water which can be split off at about 110° C. According to the conditions of precipitation, it is possible to obtain calcium silicate fillers with varying mean primary particle size, corresponding to values for specific surface area, according to BET, of about 30 to 100 sq. m./g. Processes have already been described for the production of crystalline, hydrated, relatively voluminous calcium silicates with the approximate molar ratio $CaO:SiO_2=1:1$, by means of hydrothermal treatment of mixtures of milk of lime and quartz flour or kieselguhr at about 200° C. in an autoclave.

U.S. Patent 2,679,463 describes a process wherein reactants such as calcium hydroxide, hydrochloric acid and sodium silicate are mixed in a one-step-reaction to yield an amorphous calcium silicate with a molar ratio of $SiO_2:CaO$ on the order of 20:1 to 70:1. The products of this process have approximately spherical particles, with diameters of 20 to 50 m/$\mu$, which tend to form grapelike aggregates. Therefore these calcium silicates have no high reinforcing properties and only relatively low adsorption capacity. U.S. Patent 2,665,996 discloses a crystalline hydrous calcium silicate of definite chemical composition—$4CaO \cdot 5SiO_2 \cdot 5H_2O$—called "Lepisil." This calcium silicate is prepared from lime and finely divided reactive silica in the form of quartz sand by hydrothermal reaction. The resultant product has a specific surface area of only about 50 sq.m./g. It is well crystallized showing the X-ray diffraction pattern of the mineral tobermorite in the well crystallized form according to ASTM Index No. 6–0012.

The present application relates to a finely dispersed calcium silicate, which is readily ground to an extremely loose, voluminous filler. The mole ratio $CaO:SiO_2$ amounts to 1:1.2 to 1:3, preferably to 1:1.5 to 1:2.0.

The electron microscope picture of the novel fillers indicates uniformly fine primary particles with a tendency to form small leaves with a thickness of only a few A. units. The new calcium silicate is only poorly crystallized. According to X-ray diffraction method it shows the 4 to 7 strongest X-ray diffraction lines of poorly crystallized tobermorite containing interstratified mixed hydrates.

According to ASTM Index No. 60010 the poorly crystallized tobermorites have the following X-ray diffraction pattern: 12.5; 5.3; 3.07; 2.80; 2.4; 2.1; 1.83; 1.67; 1.53; 1.40; 1.23; 1.17; 1.11; 1.07 A.

From this X-ray diffraction pattern the new tobermorite-like phase shows only the following lines 3.06; 2.79; 1.83; 1.66 A. and in some cases additionally the lines 12.7; 5.34; and 1.40 A., indicating that the calcium silicate of this invention has the disturbed lattice of a tobermorite-like calcium silicate hydrate.

The X-ray diffraction patterns given above are quite distinct from the X-ray diffraction pattern of well crystallized tobermorite according to ASTM Index No. 6–6012: 11.2; 5.5; (4.23); 3.54; 3.31; 3.10; 2.98; 2.82; 2.72; 2.52; 2.44; 2.29; (2.18); 2.14; 2.09; 2.00; 1.84; 1.77 to 1.73; 1.07; 1.62; 1.545; 1.508; 1.440; 1.401; 1.380 A.

The new calcium silicate has a sedimentation volume of about 60 to 110 ml. (2 g. of ground filler are shaken in 98 g. of toluene, and the sediment volume is read off after standing for 1 hour) and an oil adsorption value of higher than 2.0 ml./g.

The new calcium silicate fillers are superior to the crystalline calcium silicate hydrates prepared from natural substances by hydrothermal reaction or by other known processes with respect to the degree of purity, uniformity of the particles, state of fine subdivision and adsorptive capacity.

The calcium silicate according to the invention is prepared by mixing in an aqueous medium and under intense stirring calcium hydroxide with an $SiO_2$-containing compound selected from the class consisting of a low molecular weight, non-aged silicic acid and a mixture of an alkali metal silicate with about equivalent amounts referred to the alkali metal content of said silicate of an inorganic acid group consisting of calcium chloride, a hydrohalic acid and mixtures thereof, said mixing being effected in a two-step reaction, whereby in the first step a calcium silicate with an approximate molar ratio of $CaO:SiO_2$ of about 1:1 is formed with a tobermorite-like phase, showing the 4 to 7 strongest lines of the X-ray diffraction pattern of poorly crystallized tobermorite, and in the second step the silica content is raised to a $CaO:SiO_2$ ratio of 1:1.2 to 1:3 and recovering the resultant filler.

For carrying out the process, the hydrated calcium silicate with an approximately molar $CaO:SiO_2$ ratio of 1:1 and with tobermorite-like structure is first formed in aqueous suspension, and a solution of active silicic acid is then added to this with stirring, until a $CaO:SiO_2$ ratio of at least 1:1.2 has been attained.

First reaction step: calcium silicate with a $CaO:SiO_2$ ratio of about 1:1.

The preparation of the calcium silicate with an approximate molar $CaO:SiO_2$ ratio of 1:1 can be carried out by various methods. It is possible, e.g. to add milk of lime to a calcium silicate precipitate obtained from calcium chloride and water glass ($Na_2O.3.3SiO_2$) solutions up to an approximate $CaO:SiO_2$ ratio of 1:1, and to heat this mixture, with stirring, until an increase in viscosity, a reduction in the pH-value, and an increase in the transparency of the mixture indicate the formation of the new compound, or instead it is possible to mix milk of lime directly with active silicic acid in the approximate molar ratio of 1:1, whilst stirring. The term active silicic acid signifies a low molecular weight reactive silicic acid such as is present in fresh, non-aged silica sol.

The preparation of the fresh silica sol can be carried out in known manner, e.g. by first putting in hydrochloric acid and adding sodium silicate solution to it, whilst stirring until a pH-value of about 3 has been attained, the concentrations of the solutions being adjusted so that a silica sol with a content of about 5% $SiO_2$ is formed. However, it is also possible to mix the silicate solution with the acid during flow just before entry into the precipitation vessel, and this offers the possibility of operating in the less stable range of a higher pH-value, i.e. with an about neutral or weakly alkaline sol. It is also possible to employ a silica sol almost free from salt, obtained from silicate solution by an ion exchanger treatment. However, for reasons of economy, a fresh silica sol containing salt is to be preferred, since the silicates obtained according to the invention can be filtered with relative ease and can readily be washed free from chlorine. It is a characteristic for the non-aged sol to be employed that it exhibits no appreciably greater viscosity than water and no cloudiness, and that on drying it forms a glass-clear gel having a specific surface area of about 800 sq. m./g.

It is also possible to prepare the finely dispersed calcium silicate with the $CaO:SiO_2$ ratio of approximately 1:1 and tobermorite-like disturbed crystal structure by reacting milk of lime with alkali metal silicate solution and the about equivalent amount of acid or calcium salt solution, required for the neutralization of the alkali, adding the reactants separately, simultaneously or consecutively, whereby the acid or calcium salt solution are advantageously employed first and the about equivalent quantity of alkali metal silicate solution is run in subsequently.

As water-soluble silicate, water glass $Na_2O.3.3SiO_2$ is to be considered in the first place for economical reason, as acid hydrochloric acid and as calcium salt $CaCl_2$. Calcium chloride can also be used in form of NaCl-containing spent lye from the Solvay soda process. Instead of $Na_2O.3.3SiO_2$ silicates with other alkali:$SiO_2$ ratios may be used correspondingly. Metasilicates for instance react with $CaCl_2$ directly to form a calcium silicate with the 1:1 ratio.

At the first step of the process the tobermorite-like phase with the approximate $CaO:SiO_2$ ratio of 1:1 is preferentially formed by the reaction of milk of lime, hydrochloric acid and water glass, or milk of lime, calcium chloride and water glass, according to the equation $$2.3Ca(OH)_2 + CaCl_2 + Na_2O.3.3SiO_2 + nH_2O = 3.3.CaO.SiO_2.H_2O + 2NaCl + (n-1)H_2O$$

In which order the possible reactions take place when HCl is used, neutralization of the silicate solution or of the milk of lime, has not yet been ascertained. With a $CaO:SiO_2$ ratio of about 1, a tobermorite-like calcium silicate is formed in any case when stirring is carried out for a sufficiently long time at room temperature or more rapidly when the mixture is heated. The formation of the tobermorite-like phase is shown by the increased transparence of the mixture, by a considerable increase of the viscosity and a decrease of the pH-value.

The $CaO:SiO_2$ ratio in the first reaction may be higher than 1:1, but not appreciably lower. A $CaO:SiO_2$ ratio of less than about 1:1.15 i.e. 87 is detrimental.

Second reaction step: calcium silicate with a $CaO:SiO_2$ ratio of about 1:1.2 to 1:3:

To the calcium silicate with the approximate ratio of 1:1, after it has been converted into the tobermorite-like phase by heating above 40° C. or by stirring at room temperature for a duration of at least 30 minutes, there is now added, whilst stirring, fresh, reactive silica, e.g. non-aged silica sol until a $CaO:SiO_2$ ratio of at least 1:1.2, preferably 1:1.5 to 1:2 is reached. The resultant filler is filtered, washed, and dried, and optionally ground in the usual manner.

Instead of adding freshly prepared silica sol soluble silicate an acid or calcium salt solution may be added to the tobermorite-like calcium silicate with the approximate $CaO:SiO_2$ ratio of 1, until the $CaO:SiO_2$ ratio amounts to 1:1.2 to 3, preferably about 1:1.5 to 1:2. The components can be added separately simultaneously or consecutively. The order indicated for the first step is preferred, i.e. the acid or calcium salt solution is run first into the reaction vessel and the silicate solution is then added with further intense stirring.

Still another way to increase the $SiO_2:CaO$ ratio and to produce the fillers according to the invention was found by adding a freshly prepared X-ray amorphous finely dispersed calcium silicate precipitation with $CaO:SiO_2$ ratios of 1:2 to 1:6 to the disturbed tobermorite-like phase calcium silicate precipitation of the first step.

The ratio of silicate solution, preferably $Na_2O.3.3SiO_2$, to acid or $CaCl_2$ solution must not be exactly stoichiometric.

It is, for example, possible to add already the whole quantity of $CaCl_2$ solution in the first step of the process. In this case, however, and especially when an excess of alkali is used, i.e. when the quantity of acid or $CaCl_2$ is smaller than required for the reaction with the $Na_2O$ of the water glass, there are obtained fillers with coarser particles.

When the calcium silicates obtained in a $CaO:SiO_2$ ratio of about 1:1 are filtered off, washed, and dried, the products obtained are relatively hard and sandy and show some tobermorite-like lines in the X-ray diagram. Products obtained even at room temperature from $Ca(OH)_2$ and active silicic acid already exhibit the same X-ray patterns. When the adhering water is removed prior to drying, e.g. by means of acetone, the products obtained are admittedly somewhat looser with higher specific surface area values, but they do not possess the favourable properties of the fillers according to the invention.

Surprisingly, the character of the product alters fundamentally upon further addition of active silicic acid. In a $CaO:SiO_2$ ratio = 1:1.5 to 1:2, there are obtained extremely loose, voluminous fillers with high values for specific surface area at about 300 to 400 sq. m./g. The following table indicates the differences between the silicate products removed from various stages of the process, by means of values for the specific surface area and for the sediment volume (2 g. of ground filler are shaken in 98 g. of toluene, and the sediment volume is read off after standing for 1 hour). The preparation of the products listed in the table was carried out according to the following method:

5% silica sol (at pH 3), freshly prepared by mixing hydrochloric acid with water glass solution, is added to 0.5 molar milk of lime with intensive stirring, until a $CaO:SiO_2$ ratio of 1.5:1 had been attained in Experiment 1, and of 1:1 in Experiment 2, respectively. The mixture was then boiled for 1 hour in each case, and a portion was filtered off, washed, dried at 110° C. and ground in a pin mill (1a and 2a, respectively). Fresh silica sol was added again to the residue at 80 to 90° C. in the course of about 30 minutes in each case, with more stirring, until a $CaO:SiO_2$ ratio of 1:2 had been attained. The fillers 1b and 2b, respectively, are obtained, after working up accordingly by filtering, washing, drying and grinding in a pin mill, and they are characterized by high sediment volumes and high values for specific surface area.

| Exp. | $CaO:SiO_2$ | Spec. surface area sq. m./g. | Sediment volume |
|---|---|---|---|
| 1a | 1.5:1 | 45.9 | 5 |
| 1b | 1:2 | 364 | 85 |
| 2a | 1:1 | 132.4 | 5 |
| 2b | 1:2 | 355 | 88 |

The electron microscope picture of the novel fillers indicates uniformly fine primary particles mainly consisting of small leaves with a thickness of only a few A units. A slight difference exists between the products formed with silica sol and those formed by adding $CaCl_2$— and sodium silicate solution in the second step, the latter showing a few spherical particles beside the leaves. The new fillers are superior to the crystalline calcium silicate hydrates prepared from natural substances by hydrothermal reaction in respect of degree of purity, uniformity of the particles, and state of fine subdivision. In part, these exhibit different X-ray diagrams. A process has already been described wherein milk of lime is reacted with salt-free silica sol or a suspension of silica gel at 70 to 100° C. in the $CaO:SiO_2$ ratio of 1:2 to 4, according to which no difference should exist between the use of silica sol and silica gel. The extremely finely divided highly voluminous fillers which result according to the procedure of the present invention by use of fresh, non-aged silica sol are not obtained according to this known process.

The fillers produced according to the invention possess excellent properties for special purposes. Owing to their high specific surface area and voluminous nature they are excellently suited for the thickening of liquids, as anti-caking agents or grinding aids and as carrier material for active substances. They are, moreover, also suitable as reinforcing fillers for elastomers.

Example 1

3.3 litres of a 1.89 molar milk of lime, purified by hydrocyclone treatment, were diluted with 11.7 litres of water. 5 litres of a fresh 5% silica sol (corresponding to about 4.15 mol of $SiO_2$) at pH 3 were then added to this about 0.415 molar milk of lime (corresponding to 6.25 mols of CaO), whilst maintaining a temperature of 50° C. with intensive stirring within 30 minutes. The preparation of the silica sol was carried out by mixing correspondingly dilute silicate solution $Na_2O.3.3SiO_2$, with hydrochloric acid. During the addition of silica sol, the pH value decreased from more than 12 to about 11. The mixture with the approximate $CaO:SiO_2$ ratio of 1.5:1 was then boiled for 1 hour with slow stirring. Thereafter, another 10 litres of a 5% silica sol (8.35 mols of $SiO_2$), obtained according to the method described, were added with intensive stirring within 25 minutes, whereupon the temperature dropped to about 65° C. After filtering and washing on the suction funnel, there is obtained a filter cake with 12% of dry matter. The filter cake dried at 110° C. was remarkably light and voluminous. After grinding in a fast running pin mill, there was obtained a very loose, finely dispersed calcium silicate filler with a $CaO:SiO_2$ ratio of 1:2. The specific surface area, according to BET, amounted to 371 sq. m./g, the sediment volume of 2 g. of filler in 98 g. of toluene to 70 cc., and the oil absorption according to ASTM to 2.55 ml./g. A highly active commercial silicic acid filler, which was also tested for comparison, exhibited an oil absorption of 2.15 ml./g. The X-ray diagram of the calcium silicate filler exhibits the following pattern:

| d A. | I. |
|---|---|
| 3.06 | 100 |
| 2.79 | 8 |
| 1.83 | 8 |
| 1.66 | 3 |

Example 2

5 litres of a fresh 5% silica sol at pH 3—obtained from a silicate solution and hydrochloric acid—were added to 12 litres of a 0.35 molar milk of lime at room temperature within 30 minutes with intensive stirring. The mixture, having an approximate $CaO:SiO_2$ ratio of 1:1 was boiled for 1 hour. Thereafter, another 4 litres of fresh 5% silica sol were added wtih intensive stirring. After working up by filtering, washing, drying and grinding, there was obtained a very loose, finely dispersed filler with an approximate $CaO:SiO_2$ ratio of 1:1.8. The content of dry matter in the filter cake mounted to 10%, the BET value to 356 sq.m./g., the sediment volume to 60 ml. The X-ray diagram exhibited the following pattern:

| d A. | I |
|---|---|
| 12.7 | 70 |
| 5.34 | 5 |
| 3.06 | 100 |
| 2.79 | 10 |
| 1.83 | 20 |
| 1.66 | 8 |
| 1.40 | 5 |

In a comparative experiment the sol prepared from a silicate solution and hydrochloric acid was replaced by a 5% silica sol, obtained by treatment with a H ion exchanger from a silicate solution (a sol of this type on drying also yields a glass clear silica gel, with a BET value of about 800 sq.m./g.). The calcium silicate filler obtained with this sol, which naturally does not require washing owing to the sol being free from salt, had the same properties as the one described above.

In a further comparative experiment, the fresh silica sol was replaced by a stable, commercial silica sol with a specific surface area of 200 sq. m./g. (determined on the gel obtained from it), whilst otherwise the procedure was the same. Apart from the lack of the internal lines the resultant calcium silicate filler has the same X-ray diagram. Despite the fact that the BET value amounts to 302 sq.m./g. and that the filter cake can be readily crushed the product has a sandy feel, and after grinding it only yields a sediment volume of 25 ml. Oil absorption is also appreciably lower than for the fillers described above.

Example 3

22.7 litres of purified 1.96 molar milk of lime are diluted with 127.3 litres of water. 215 litres of concentrated hydrochloric acid, diluted to 39 litres, are added to the dilute milk of lime within 3 minutes. Subsequently 7.9 litres of commercial sodium water glass, diluted with 16.5 litres of water, are added within 7 minutes with intense stirring. The resulting mixture with the approximate $CaO:CiO_2$ ratio 1 is heated to 70° C. and kept at this temperature for about 15 minutes. Its viscosity and transparence is thereby increased, but there is no marked change by further stirring and heating.

To the tobermorite-like calcium silicate precipitate now present there are added once more 2.15 litres of concentrated hydrochloric acid, diluted to 39 litres, within 3 minutes and 7.9 litres of water glass, diluted with 16.5 litres of water, within 7 minutes. The solutions are run into a zone of high turbulence, close to the stirrer. The precipitate with the now resulting $CaO:SiO_2$ ratio of 1:2 is worked up as usual by filtering, washing and drying. The moist filter cake has a solid content of 10.6% and shrinks on drying to about 68% of the original volume. The specific surface area of the dry filler, measured according to BET, amounts to 325 sq.m./g. After grinding in a pin mill a very voluminous filler is obtained, 2 g. of which shaken in 98 g. of toluene show a sedimentation volume of 90 cc. (1 g. in 98 g. of toluene about 50 cc.).

Example 4

To 8 litres of 0.3 molar milk of lime there are added 2 litres of a 0.5 molar calcium chloride solution and subsequently 2 litres of a 0.5 molar solution of water glass ($Na_2O.3.33SiO_2$) into the suction area of an intense stirring device. The mixture with the $CaO:SiO_2$ ratio of about 1 is heated to 70° C. Subsequently, there are once more added in the same manner within about 2 minutes 2 litres of 0.5 molar $CaCl_2$ solution and 2 litres of 0.5 molar water glass solution. When the precipitation is finished, the pH value amounts to 10.2 and is thus somewhat higher than that in Example 1 where a final pH value of 9.7 was established. The washed filter cake has a solid content of 11.5% and shrinks on drying at 110° C. to about 80% of its original volume. After grinding in a pin mill a very voluminous filler of the approximate formula CaO.1.55SiO$_2$.1.55H$_2$O and a specific surface area of 355 sq. m./g. is obtained. The sedimentation volume (see Example 3) amounts to 105 cc. (1 g. of the filler in 98 g. of toluene about 65 cc.).

*Example 5*

4 litres of a 0.3 molar soda-water glass solution (Na$_2$O.3.35SiO$_2$) are added to 4 litres of 0.33 molar calcium chloride solution over a period of 15 minutes while stirring vigorously, thereby the silicate solution flows into the calcium chloride solution in the immediate vicinity of the stirrer device. The precipitate of calcium silicate which is obtained is amorphous to X-rays and has the approximate composition CaO.3.35SiO$_2$.xH$_2$O. The suspension has a solid content of 43 g./litre.

In a second mixture, 0.8 litre of a 0.5 molar calcium chloride solution and 1 litre of a 0.45 molar water glass solution (Na$_2$O.3.35SiO$_2$) are added to 4 litres of 0.3 molar milk of lime while stirring and the mixture is thereafter heated for about 15 minutes to 70° C. A tobermorite-like phase having the approximate composition CaO.SiO$_2$.H$_2$O forms and the mixture becomes thicker and more vitreous. The precipitation has a solid content of 35 g./litre.

The precipitation of the calcium silicate A which is amorphous to X-rays is now mixed with tobermorite-like phase B in different ratios while stirring for 5 to 10 minutes. The mixtures are suction filtered and washed. One specimen of each of the pure precipitates is worked up in the same manner. After thoroughly suction filtering, cylinders are formed from the filter cakes by pressing into a glass cylinder with a height of 45 mm., and a diameter of 30 mm. These filter cake cylinders are dried at 110° C. and thereafter measured and weighed. In this manner, the ratio $$\frac{\text{Volume dry}}{\text{Volume moist}} = \frac{V}{V_o}$$

and the apparent density are determined. The higher the ratio $V/V_o$ the lower is the shrinkage on drying. The lower the apparent density, the more voluminous is the secondary structure of the filler and the higher is its absorption power for liquids. The tobermorite-like calcium silicate with the approximate composition CaO.SiO$_2$.H$_2$O and also the mixtures with a high CaO content up to a ratio of approximately CaO:1.5SiO$_2$ give filter cake cylinders which automatically break up into small pieces after drying. In these cases, a direct evaluation is not possible. The measuring of the volume is effected by displacement of trickling quartz sand.

The path of the ratio $V/V_o$ and of the apparent density of the dry filter cake in relation to the mixing ratio is to be seen from the accompanying graph. Whereas the pure tobermorite-like calcium silicate and the calcium silicate CaO.3.3SiO$_2$ which is amorphous to X-rays shrink to one-tenth and about one-third respectively of the moist filter cake volume, the volume with a mixture of 40 parts CaO.SiO$_2$ with 60 parts of CaO.3.3SiO$_2$ only falls to about 0.75 of the moist volume. The weight per litre of the dry filter cake is only about 150 g. with this mixing ratio.

I claim:

1. A dry loose finely dispersed calcium silicate filler, having the disturbed lattice of tobermorite containing interstratified mixed hydrates, said tobermorite-like phase showing at least the following 4 X-ray diffraction lines: 3.06; 2.79; 1.83; 1.66 A., and no more than the following 7 X-ray diffraction lines: 3.06; 2.79; 1.83; 1.66; 12.7; 5.34; 1.40 A., said calcium silicate fillers having a molar ratio of CaO:SiO$_2$ of between 1:1.5 and 1:2, a specific surface area of about 300 to 400 sq. m./g. according to BET, a sedimentation volume of about 60 to 110 ml. and an oil absorption value higher than 2.0 ml./g.

2. A process for the production of a finely dispersed calcium silicate filler, having the disturbed lattice of tobermorite containing interstratified mixed hydrates, said tobermorite-like phase showing at least the following 4 X-ray diffraction lines: 3.06; 2.79; 1.83; 1.66 A., and no more than the following 7 X-ray diffraction lines: 3.06; 2.79; 1.83; 1.66; 12.7; 5.34; 1.40 A., said calcium silicate fillers, having a molar ratio of CaO:SiO$_2$ of between 1:1.2 and 1:3 and a specific surface area of about 300 to 400 sq. m./g. according to BET, which comprises a two-step-reaction, wherein in the first step in an aqueous medium and under intense stirring milk of lime is mixed with an SiO$_2$-containing compound selected from the group consisting of a low molecular weight, non-aged silicic acid and a mixture of an alkali metal silicate with about equivalent amounts referred to the alkali metal content of said silicate of an inorganic acid group consisting of calcium chloride, a hydrohalic acid and mixtures thereof to form a calcium silicate with an approximately molar ratio of CaO:SiO$_2$ of 1:1, with said tobermorite-like phase and mixing in the second step said tobermorite-like phase with an amount of a member selected from the group consisting of (a) non-aged silicic acid,
(b) a mixture of an alkali metal silicate with about equivalent amounts referred to the alkali metal content of said silicate of an inorganic acid group consisting of calcium chloride, hydrohalic acids and mixtures thereof, and
(c) a freshly precipitated suspension of amorphous calcium silicate with a CaO:SiO$_2$ ratio between about 1:2 and 1:6;

to raise the SiO$_2$-content of said tobermorite-like phase to a CaO:SiO$_2$ ratio of 1:1.2 to 1:3 and recovering the resultant filler.

3. Process according to claim 2, wherein the formation of the tobermorite-like phase is accelerated by heating the aqueous slurry to a temperature of above 40° C.

4. Process according to claim 2, wherein the SiO$_2$:CaO ratio of the tobermorite-like phase is raised up to 1.5:1 to 2:1.

5. A process according to claim 2, wherein the alkali metal silicate is an aqueous solution of sodium silicate.

6. A process according to claim 2, wherein the inorganic acid group containing compound is hydrochloric acid.

7. A process according to claim 2, wherein the inorganic acid group containing compound is calcium chloride.

8. A process according to claim 2, wherein the slurry of the tobermorite-like phase is mixed with a freshly prepared precipitation of an X-ray amorphous finely dispersed calcium silicate with a CaO:SiO$_2$ ratio of between 1:2 and 1:6.

9. A process for the production of finely dispersed calcium silicate filler having a tobermorite-like, disturbed crystal structure which comprises adding active silicic acid to an aqueous suspension of calcium silicate with an approximate molar CaO:SiO$_2$ ratio of 1:1 and a tobermorite-like phase in amounts sufficient to provide a CaO:SiO$_2$ ratio of from 1:1.2 to 1:3 and recovering the resulting filler from suspension.

10. A process according to claim 4, wherein the active silicic acid is added in the form of a non-aged silica sol while intensely agitating the suspension.

11. A process according to claim 9, wherein the aqueous suspension of calcium silicate is provided by mixing non-aged silica sol and an aqueous slurry of milk of lime in approximately molar ratio of 1:1 while intensely stirring.

12. A process for the production of finely dispersed calcium silicate filler having a tobermorite-like disturbed crystal structure which comprises reacting a freshly precipitated calcium silicate suspension having a molar ratio of CaO:SiO$_2$ above about 0.87 with a material containing reactive amorphous SiO$_2$ to thereby increase the SiO$_2$ content to between 1.2 and 3 mols per mol of CaO, thus forming finely dispersed calcium silicate filler.

13. Process according to claim 14 in which said material containing amorphous reactive $SiO_2$ is a freshly precipitated suspension of amorphous, finely dispersed calcium silicate with a $CaO:SiO_2$ ratio of between 1:2 and 1:6.

14. Process according to claim 12 in which said material containing amorphous reactive $SiO_2$ is a mixture of an alkali metal silicate with an equivalent amount, referred to the alkali metal content of said silicate, of a member selected from the group consisting of calcium chloride, hydrohalic acids, and mixtures thereof.

15. Process according to claim 12 in which said material containing an amorphous reactive $SiO_2$ group is active silicic acid.

References Cited by the Examiner

Brunauer and Greenberg, "The Hydration of Tricalcium Silicate and B-Dicalcium Silicate at Room Temperature," Proceedings of the Fourth International Symposium on the Chemistry of Cement, Washington, D.C., 1960, pp. 137, 140–145, 148–151.

"Hydrated Calcium Silicates, Part I," Journal of the Chemical Society, London (1950), pp. 3682–3689.

Proceedings of the Third International Symposium on the Chemistry of Cement, London, 1952, pp. 220, 221, 258, 269, 270, 314–316.

Steinour, "The System $CaO$-$SiO_2$-$H_2O$ and the Hydration of the Calcium Silicates," Chemical Reviews, (1947), vol. 40, pp. 392, 393.

The Chemistry of Cements, H.F.W. Taylor 1964, Academic Press, London and N.Y., vol. 1, pp. 181–184, 192–196.

The Chemistry of Cement and Concrete, Lea and Desch, 2nd Edition 1956. Edward Arnold Ltd., London, pp. 179, 183, 185, 186.

TOBIAS E. LEVOW, *Primary Examiner.*

J. E. POER, S. E. MOTT, *Assistant Examiners.*

UNITED STATES PATENT OFFICE
CERTIFICATE OF CORRECTION

Patent No. 3,316,116                                   April 25, 1967

Ernst Podschus

It is hereby certified that error appears in the above numbered patent requiring correction and that the said Letters Patent should read as corrected below.

Column 1, line 56, for "m/μ" read -- mμ --; column 6, line 38, for "215 litres" read -- 2.15 litres --; line 44, for "CaO:CiO$_2$" read -- CaO:SiO$_2$ --; column 9, line 1, for "14" read -- 12 --; line 16, the following references should be included:

UNITED STATES PATENTS

| | | |
|---|---|---|
| 2,665,996 | 1/54 | Kalousek 23-110 |
| 2,679,463 | 5/54 | Alexander et al. 106-306 |

Signed and sealed this 21st day of November 1967.

(SEAL)
Attest:

EDWARD M. FLETCHER, JR.                          EDWARD J. BRENNER
Attesting Officer                                   Commissioner of Patents